United States Patent [19]
Denis et al.

[11] Patent Number: 5,833,203
[45] Date of Patent: Nov. 10, 1998

[54] SYSTEM FOR FITTING A PART OF A SEAT TO A MOTOR VEHICLE

[75] Inventors: Bernard Denis, Montlhery; Philippe Pedronno, Marcoussis, both of France

[73] Assignee: Bertrand Faure Equipements S.A., Boulogne, France

[21] Appl. No.: 587,908

[22] Filed: Jan. 16, 1996

[30] Foreign Application Priority Data

Jan. 16, 1995 [FR] France .................................. 95 00683

[51] Int. Cl.⁶ .................................................. A47B 97/00
[52] U.S. Cl. .................................. 248/503.1; 248/220.22; 296/65.1
[58] Field of Search .......................... 248/503.1, 220.22, 248/231.81, 222.11, 291.1, 251, 500; 296/65.1; 297/250, 440.2, 440.15

[56] References Cited

U.S. PATENT DOCUMENTS 3,915,493  10/1975  Brown .
4,191,417   3/1980  Ferrara ..................................... 296/65.1
4,273,376   6/1981  Duguet et al. .......................... 296/65.1
4,742,984   5/1988  Cote et al. .
4,822,092   4/1989  Sweers et al. .
4,916,778   4/1990  Iguchi .
5,263,763  11/1993  Billette ................................... 296/65.1

FOREIGN PATENT DOCUMENTS 37 06 395  9/1988  Germany .

*Primary Examiner*—Leslie A. Braun
*Assistant Examiner*—Willie Berry, Jr.
*Attorney, Agent, or Firm*—Pollock, Vande Sande & Priddy

[57] ABSTRACT

A securement system is provided for vehicle seats. A seat part has, on each side, a journal that is engaged in a mounting connected to the vehicle structure. The journal is secured in a throat formed in the mounting by a locking part surrounding the journal and serving as its bearing. The locking part has a locking portion that engages retaining means provided on the sides of the throat. The locking portion is elastically deformable to permit its insertion when mounted on the journal, into the throat and in a direction perpendicular to the axis of the journal.

10 Claims, 2 Drawing Sheets

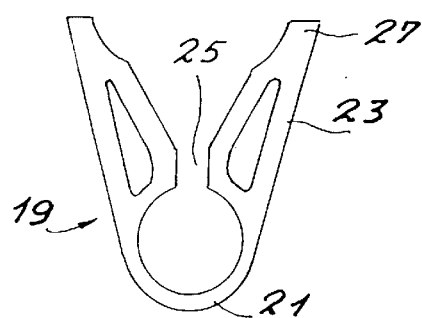
FIG. 4
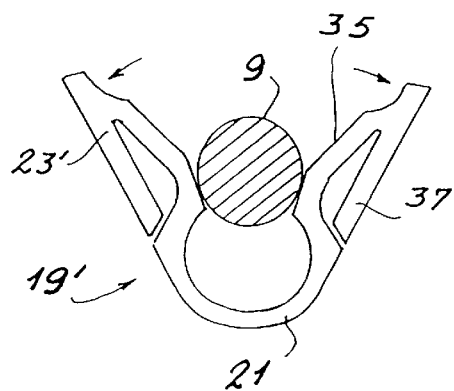
FIG. 5 a
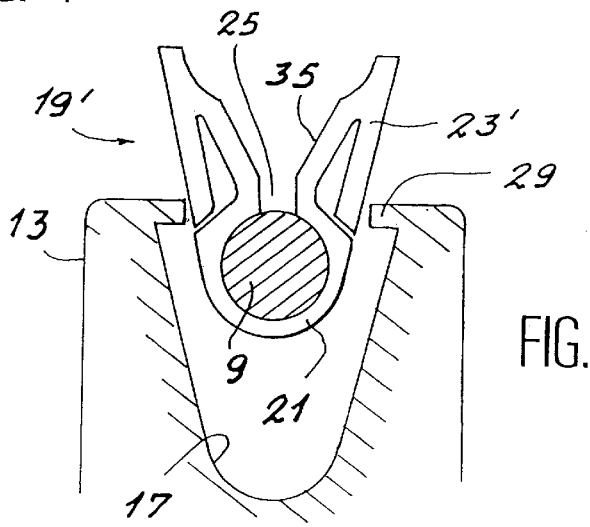
FIG. 5 b
FIG. 5 c
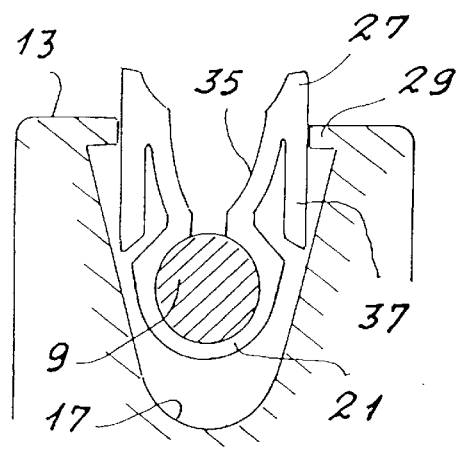
FIG. 5 d
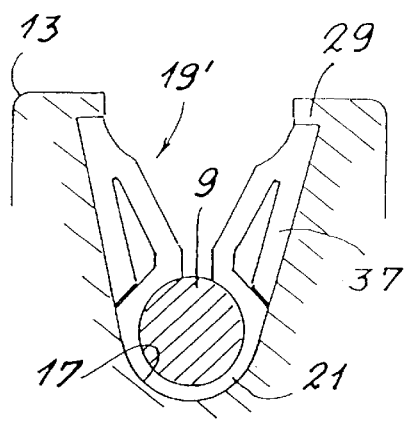

SYSTEM FOR FITTING A PART OF A SEAT TO A MOTOR VEHICLE

FIELD OF THE INVENTION

The present invention relates to the fitting of seats, especially rear seats and more particularly the backs of these, in a motor vehicle.

BACKGROUND OF THE INVENTION

The backs of rear seats are often designed to be able to be folded down onto the squab, as for example in order temporarily to enlarge the loadable volume of the boot. These backs are made either in one piece (non-split seat backs) or in two parts that can be folded independently of each other or simultaneously (known as 60/40 split seat backs).

Connection systems comprising, in particular, lugs attached to the bodywork of the vehicle on either side of the back rest and serving as bearings in which journals joined to the frame of the back rest are installed, are known. Said lugs comprise a slot whose width is narrower than the diameter of the journals, and the journals comprise flats enabling the journals to be inserted into the bearings when the back is in a certain position with the flats oriented parallel with the slot. When the back is pivoted into the position of use, the flats now lie transversely to said slot and the journals cannot now be disengaged from the bearings. Such a system, used especially on one-piece backs, allows the back to be removed easily, but exhibits inadequate resistance to tearing out, notably when a violent impact throws the contents of the boot against the seat back.

For fitting two-part backs, known connection systems generally have, on each side of the two parts of the back, hinges comprising a part joined to the frame of the back and pivoting in or on one or more mountings screwed to the bodywork. Fitting such systems requires the use of tools such as power screwdrivers, and the result is that the fitting time is comparatively long, and made the more difficult in that the mountings cannot be screwed down without the back being already in position.

BRIEF DESCRIPTION OF THE PRESENT INVENTION

The object of the present invention is to solve these problems and in particular to facilitate and speed up the fitting of seat parts, especially the backs of rear seats, whilst also ensuring that the connection has good strength.

With these aims in view, the subject of the invention is a system for fitting a part of a seat, especially the back of a rear seat, to a vehicle, characterized in that:

said seat part has, on each side, a journal engaged in a mounting connected to the vehicle structure, said mounting has a throat in which said journal is located, the journal is secured in said throat by a locking part surrounding the journal and serving as its bearing and having locking means that engage with retaining means provided on the sides of said throat to secure said locking part transversely relative to the axis of the journals, said locking part being elastically deformable to permit its insertion, when mounted on the journal, into said throat, in a direction perpendicular to the axis of the journals.

With the system according to the invention, it is sufficient, during the final fitting of the seat part, which may be for example a 60/40 rear seat back, to present the back in position, i.e. with the journals fitted with the locking parts over the mountings, and to push the locking parts into the throats of the mountings until the locking means engage with said retaining means by elastic return.

Thus, no tool is needed during fitting, which is carried out easily and quickly.

It will be observed that the mountings have to be connected to the bodywork of the vehicle beforehand. However, the positioning and fastening of these mountings, which may be done conventionally by welding, can be carried out at the same time as other fastening elements are being connected to the bodywork, and therefore does not generate any extra time.

In one particular arrangement, the locking part has a middle portion forming the bearing of said journal, said middle portion being in the shape of an open ring defining a longitudinal slot and being elastically deformable to permit it to be fitted onto the journal, perpendicularly to the latter's axis, by widening said slot.

In addition to giving the locking part sufficient elasticity to permit its insertion into the throat of the mounting, the possibility of widening it elastically means that said locking part can be fitted to the journal perpendicularly to the direction of its axis. This arrangement is especially advantageous when the journals, which extend one on each side of the seat part, have at their ends axial stop means for the transverse location of the seat part. Moreover these axial stop means preferably extend radially beyond the periphery of the middle portion of the locking part and, in consequence, abut against the sides of the mountings. They therefore secure the seat part efficiently and prevent the journal from sliding axially and escaping from its mounting, as could happen if the frame of the seat were bent in such a way as to bring the two journals towards each other.

Other particular arrangements are as follows:

the locking part has two lips that extend away from the parts of said ring that are adjacent to said slot and that comprise said locking means, the locking means are formed by the ends of said lips furthest from the middle portion, and the retaining means of the mounting consist of shoulders extending away from the sides of said throat, the ends of the lips engaging underneath said shoulders when the locking part is in place in the throat, said lips are rigid and the middle portion is extensible in order that, as the locking part is being inserted into the throat of the mounting, the lips can be brought towards each other, the locking part having been installed on the journal, said lips have a flexible connecting arm extending away from the edges of said slot and a stop arm joined to the end of said connecting arm and extending back, against the sides of the throat, to said middle portion.

Other features and advantages will become clear in the description which will now be provided, by way of a nonrestrictive example, of a system for fitting two-part rear back rests.

Reference should be made to the accompanying drawings in which:

FIG. 1 is a perspective view showing on the left-hand side one of the parts of the fitted back-rest, and on the right-hand side the other seat part, before fitting, FIG. 2 is a partial front view of a back-rest part with its two mountings, FIG. 3 is a cross section on the line marked III—III in FIG. 2 but also showing, in chain lines, the elastically deformed locking part during fitting, FIG. 4 is a side view of said locking part, and FIG. 5 a) to 5 d) show different stages of the fitting, in the case of an alternative embodiment of the locking part.

DETAILED DESCRIPTION OF THE INVENTION

Figure 1:
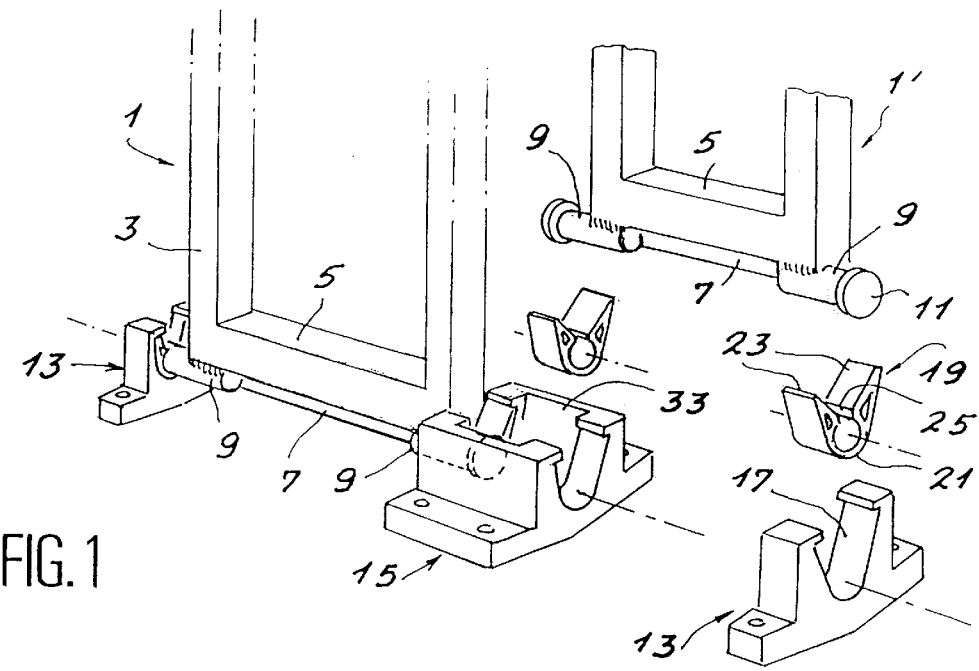

In the drawing shown in FIG. 1, the two parts 1 and 1' of the back, which is of the 60/40 type, are depicted schematically by their frames 3 only. It should be noted that, in practice, fitting is carried out with the seat backs already fitted with their padding and cover.

The frame 3 has a lower horizontal cross member 5, one lower corner of which is made into a kind of concave camfer 7 (produced in practice by shaping the sheet metal of which this cross member is made).

On each side, journals 9 of horizontal axis are welded to the cross member 5, being first positioned in said camfer 7, the cross section of which has a radius of curvature corresponding to that of the journals. This arrangement helps in positioning the journals before they are welded and improves the rigidity of the joint between the journals and the frame.

Each journal 9 has at its end a circular enlargement 11, produced for instance by forging, and serving as an axial stop, as will be seen later.

Fastened to the bodywork (not shown) of the vehicle are mountings 13 designed to take the journals 9. The mountings 13 may be screwed to the bodywork or, preferably, welded to it before its interior upholstery is put in. In the case of a two-part back, shown in FIG. 1, the mountings 13 situated towards the sides of the vehicle are single mountings, whereas those situated towards the middle of the vehicle are formed as a single piece 15 that takes the adjacent journals of both portions of the back.

The mountings 13 have a throat 17 in the general form of a V, which corresponds to the external form of a locking part 19.

This locking part 19, which can be made of, for example, plastic, has a ring-shaped middle portion 21, the internal diameter of which is approximately equal to that of the journals 9, open at a longitudinal slot 25 and serving as a bearing for the journal 9, and two lips 23 integral with the middle portion 21 and extending away from the latter at an oblique angle relative to each. other. In the drawings shown in FIGS. 1 to 4, the locking part is shown in a first embodiment. An alternative embodiment will be described later with reference to FIGS. 5a to 5d.

In the first embodiment, the lips 23 are triangular in cross section and are therefore comparatively rigid and resistant to deformation. In the assembled state, as can be seen more clearly in FIG. 3, the outer faces of these lips are pressed against the sides of the throat 17, while the upper ends 27 of the lips 23 are engaged underneath shoulders 29 extending in towards each other from the edges of said throat 17. In this position, therefore, the middle portion 21 surrounds almost the entire circumference of the journal 9, excepting the region of the slot 25, and the journal is thus firmly secured radially in the mounting 13 because the ends 27 of the lips 23 abut against the underside of the shoulders 24.

Figure 2:
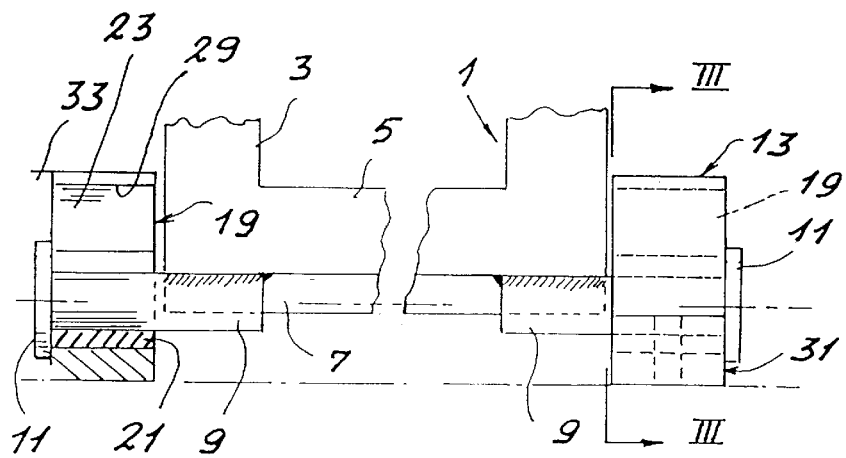
Figure 3:
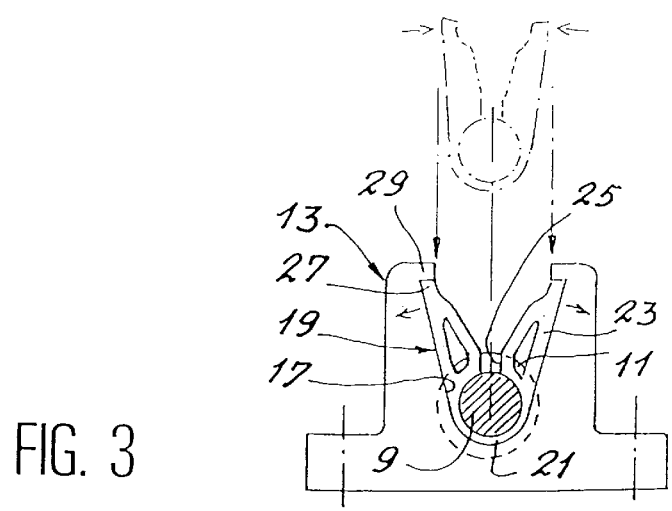

Also, as can be seen in FIGS. 2 and 3, the enlargements 11 on the ends of the journals have a larger diameter than the external diameter of the middle portion 21 and therefore than that of the bottom of the throat 17. The enlargements 11 thus form an axial stop against the lateral face 31 of the mounting, preventing the journal from coming out by an axial movement. In addition, the locking part is also trapped axially between the enlargement 11 and the frame 3 of the back.

As can be seen in FIG. 1, the two mountings situated towards the middle of the vehicle are joined by stiffening ribs 33. Making these two mountings in the form of a single piece 15 improves the back's resistance to deformation and tearing out, by ensuring, through the axial stop action of the enlargements 11, that the two parts of the back cannot be moved apart.

In this first embodiment of the locking part 19, fitting each part of the back is made possible by the elasticity of the middle portion 21 and the slight allowance for elastic deformation of the lips 23. Fitting is thus carried out in the following manner:

the locking parts 19 are first fitted radially on the journals 9, the slot 25 being able to open sufficiently by virtue of the elasticity of the middle portion 21, the back part 1, 11 is then placed on top of the mountings 13. As it is pushed down, the locking parts begin to enter the throat 17 and the lips 23 move towards each other as they pass the shoulders 29. Because of the great rigidity of the lips 23, the latter are enabled to move towards each other owing essentially to the presence of the slot 25 and to the elasticity of the middle portion 21. The position of the locking part 19 during insertion is illustrated in chain lines in FIG. 3, at the end of insertion, when the middle portion 21 reaches the bottom of the throat 17, the ends 27 of the lips 23 drop beneath the shoulders 29 and spring apart.

FIGS. 5a to 5d show the different stages of the fitting operation in the case of an alternative embodiment of the locking part. This embodiment is designed to further facilitate fitting by reducing the effort required to insert the journals into the mountings.

In this alternative, the locking part 19' is basically identical in general shape to the part described earlier, but the lips 23' are so made as themselves to be deformable to allow them to fit between the shoulders 29. To this end, each lip 23' has a flexible connecting arm 35 that extends away from the edges of the slot 25 and a stop arm 37 that extends back from the end of the arm 35 towards said middle portion, but without being joined to it. This stop arm is rigid. and it is basically this arm that, by working in compression, ensures that the locking part is immobilized between said middle portion 21 and the shoulder 29, in case a force occurs tending to disengage the journal from the mounting.

In this alternative, the locking part is fitted onto the journal in the same way as indicated earlier. However, for insertion into the mounting, the lips are enabled to move towards each other by the flexing of the flexible arms 35, as can be seen in FIG. 5c.

The material of the locking part may, for instance, be a fibre-reinforced plastic.

The invention is not limited to the fitting systems which have just been described by way of example.

In particular, the shape of the throat, the locking means of the locking part, and the retaining means of the mounting could be made differently while performing the same functions. For example, the sides of the throat could be approximately parallel and the locking means could be formed on the outer faces of the locking part, in such a way that they could be retracted during insertion into the throat and, once in place, could then lock into recesses provided for this purpose in the sides of the throat.

Likewise, the axial stops of the journals could be made in any other way than as the enlargement described earlier, provided this stop has at least one radial dimension sufficient to exert the axial stop action against the mounting.

Lastly, this fitting system, though especially advantageous in the case of two-part rear seat backs, can also be used on one-part backs, or on seat squab parts.

We claim:

1. System for fitting a part of a seat (1, 1'), especially the back of a rear seat, to a vehicle, characterized in that:

said seat part has, on each side, a journal engaged in a mounting connected to the vehicle structure, said mounting has a throat in which said journal is located, the journal is secured in said throat by a locking part surrounding the journal and serving as its bearing and having locking means that engage with retaining means (29) provided on the sides of said throat to secure said locking part transversely relative to the axis of the journals, said locking part being elastically deformable to permit its insertion, when mounted on the journal, into said throat, in a direction perpendicular to the axis of the journals.

2. System according to claim 1, wherein the locking part has a middle portion forming the bearing of said journal, said middle portion being in the shape of an open ring defining a longitudinal slot and being elastically deformable to permit it to be fitted onto the journal, perpendicularly to the latter's axis, by widening said slot.

3. System according to claim 2, wherein the locking part has two lips that extend away from the parts of said ring that are adjacent to said slot and that comprise said locking means.

4. System according to claims 3, wherein said lips are rigid and the middle portion is elastic in order that, as the locking part is being inserted into the throat of the mounting, the lips can be brought towards each other, the locking part having been installed on the journal.

5. System according to claims 3, wherein said lips have a flexible connecting arm extending away from the edges of said slot and a stop arm joined to the end of said connecting arm and extending back, against the sides of the throat, to said middle portion.

6. System according to claim 2, wherein the locking means are formed by the ends of said lips furthest from the middle portion, and the retaining means of the mounting consist of shoulders extending away from the sides of said throat, the ends of the lips engaging underneath said shoulders when the locking part is in place in the throat.

7. System according to claim 1, wherein the locking part is made of fibre-reinforced plastic.

8. System according to claim 1, wherein the journals, which extend one on each side of said seat part, have at their ends axial stop means extending radially beyond the periphery of the middle portion of the locking part.

9. System for fitting seat parts in two portions, according to claim 1, wherein the mountings corresponding to the adjacent journals of said two portions are made as one piece.

10. System according to claim 1, wherein the journals are welded to a cross member of said seat part in a concave camfer corresponding in cross section to the journals 35 and formed on said cross member.

* * * * *